US006625583B1

(12) United States Patent
Silverman et al.

(10) Patent No.: US 6,625,583 B1
(45) Date of Patent: Sep. 23, 2003

(54) HANDHELD TRADING SYSTEM INTERFACE

(75) Inventors: Andrew F. Silverman, Holmdel, NJ (US); Matthew Lavicka, New York, NY (US); David W. Ngai, Brooklyn, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 09/413,150

(22) Filed: Oct. 6, 1999

(51) Int. Cl.[7] .............................................. G06F 17/60
(52) U.S. Cl. .............................. 705/36; 705/37; 705/35
(58) Field of Search ...................................... 705/37, 35

(56) References Cited

U.S. PATENT DOCUMENTS

| | | | | |
|---|---|---|---|---|
| 4,674,044 A | * | 6/1987 | Kalmus et al. ................. | 705/37 |
| 5,297,032 A | * | 3/1994 | Trojan et al. ................... | 705/37 |
| 5,717,989 A | * | 2/1998 | Tozzoli et al. ................. | 705/37 |
| 5,915,245 A | * | 6/1999 | Patterson ....................... | 705/35 |
| 5,963,923 A | * | 10/1999 | Garber .......................... | 705/37 |
| 6,014,643 A | * | 1/2000 | Minton .......................... | 705/37 |
| 6,029,146 A | * | 2/2000 | Hawkins et al. ............... | 705/35 |
| 6,058,379 A | * | 5/2000 | Odom et al. ................... | 705/37 |
| 6,105,005 A | * | 8/2000 | Fuhrer .......................... | 705/35 |

FOREIGN PATENT DOCUMENTS

| EP | 0851 701 A2 | * | 1/1998 | ............ | H04Q/7/38 |
|---|---|---|---|---|---|

OTHER PUBLICATIONS

"Jumping on the Info Bus"–Mccright, John–eWeek Jun. 12, 1998.*

* cited by examiner

*Primary Examiner*—Geoffrey R. Akers
(74) *Attorney, Agent, or Firm*—Joseph P. Kincart; Clifford Chance US LLP

(57) ABSTRACT

A computer implemented method for interacting with a user of a trading computer includes forming a number of ticker pages, simultaneously displaying ticker page selection elements, and displaying one of the ticker pages based on an input identifying one of the page selection elements. Each ticker page includes trade order information for a negotiable item (such as a stock or other equity) and each ticker page selection element is associated with one of the ticker pages. A trading computer includes a screen that can operate as both an output display and an input digitizer and a processor coupled to the screen and to a memory. The memory includes instructions for causing the processor to form and display ticker pages on the screen. Each ticker page includes trade order information for a different negotiable item. A currently displayed ticker page may be determined based on a selection of a ticker page selection elements. The ticker page selection elements may be rendered as page tabs that are displayed at a different output display location. The computer memory also may include additional instructions for implementing other methods of the invention.

34 Claims, 10 Drawing Sheets

APPLICATION TABS

ORDER PAGE TABS

APPLICATION TABS; LOOKS AND E-MAIL UNAVAILABLE

HANDHELD TRADING SYSTEM INTERFACE

CROSS-REFERENCE TO RELATED APPLICATIONS

This application cross-references and incorporates by reference the application Ser. No. 09/413,270 entitled Order Centric Tracking System also filed Oct. 6, 1999.

BACKGROUND

There exist several types of financial markets in which securities, commodities, and other negotiable instruments are traded. An auction market, such as a stock exchange, is one such financial market. In an auction market, buyers and sellers congregate on the exchange floor and announce their respective bid (offered to buy) and ask (price acceptable to sell) prices. A trade in any particular security will occur at no more than the highest price a buyer is willing to pay and at no less than the lowest price a seller is willing to accept.

Among the players on the floor of an exchange are specialist and floor brokers. Specialist call out the best bid and ask prices received from the various brokers, ensures that trades are posted, facilitate trades, and acts to ensure liquidity. Floor broker roams the trading floor and acts as an agent to transacts orders on behalf of investors (buyers and sellers).

A typical transaction originates when an order is placed with an off-the-floor-trading desk (a.k.a. a "trading booth") to buy or sell a particular security. The trading desk may then convey the order to a exchange clerk who notes the parameters of the order including whether the order is a buy or sell order, the symbol of the security, the quantity, the price, any special conditions associated with the order, and the time that the order is placed. The clerk then delivers the order to the floor broker for execution. Traditionally, the orders are transcribed onto order slips that are delivered to the floor brokers by pages or runners. The floor broker then executes the order, notes the executed order on a slip of paper, and subsequently returns the notated slip of paper to the clerk via a runner.

In addition to buy and sell orders, investors may request a "look" from the floor of the exchange. In response to a "look" request, a broker notes his or her observations with respect to what is happening in the market for a particular security. The "look" information noted by the broker may vary depending on the particular broker and what he or she has observed. For example, "look" information may include: recent buyer and seller identities, trade sizes and prices, an appraisal of market interest, the trader's opinion, and any other information that the trader can or may wish to provide.

A number of problems exist with the use of runners to deliver trade orders, confirmations, and other information. These problems can include trade execution delays resulting from illegibly transcribed orders, dropped slips, or delayed delivery. Other problems include an inability to easily maintain a clear audit trail. To address these problems, and/or to provide other advantages, auction markets are currently exploring whether networked hand-held computers can be used to exchange information with floor traders. If such computers are to function effectively, they must be easy to operate and must quickly convey needed information. Consequently, improved hand-held computer systems are desired.

SUMMARY

A handheld trading computer (the "handheld trading computer") can be used by a broker to exchange trading orders and information with an off-floor server over a wireless computer network. The handheld trading computer can include an interface modeled on traditional paper-based trading forms. The interface may represented data using graphically rendered "pages" that can display and receive figures, drawings, symbols, and arbitrary marks. The "pages" may also include input areas in which a user can write using "digital ink." Digital ink writings may be bit-mapped images containing arbitrary annotations, drawings, and other marks formed using an input stylus. The digitally rendered pages can be stacked such that underlying pages are partially displayed, thereby allowing direct selection of exposed pages without requiring menu navigation. Pages may also contain graphically rendered objects that a user can interact with using a stylus.

In general, in one aspect, the invention features a computer implemented method for interacting with a user of a trading computer. The method includes forming a number of ticker pages, simultaneously displaying ticker page selection elements, and displaying one of the ticker pages based on an input identifying one of the page selection elements. Each ticker page includes trade order information for a negotiable item (such as a stock or other equity) and each ticker page selection element is associated with one of the ticker pages.

Implementations may include one or more of the following features. The ticker pages may be displayed on a display screen that has multiple display areas, each of which is associated with a digitizer input location. Each ticker page selection elements may be displayed as a page tab at a different screen area. Ticker selection elements can be identified based on digitizer inputs locations. Ticker pages may include one or more simultaneously displayed order objects that each represent a buy or sell order and includes price and order size information. The size information may be a "leaves" size value identifying an unfilled portion of the order. Buy and sell order objects may use different display characteristics (e.g., different font, color, shade, and shape). Multiple order objects can be selected and aggregated price and/or size information for the multiple selected order objects can be displayed. Order objects may be modified based on inputs of trade execution data. Modifying an order object may include reducing the leaves size value. If multiple order objects are selected when trade execution data is input, the multiple order objects may each be modified based on the trade execution data (for example, in a sale, the leaves value of each of the selected order objects may be reduced by an apportioned amount). A ticker page may include a nested order transaction page that includes transaction data input fields. Trade execution data may be input on order transaction pages. Ticker pages may include separate buy and sell order transaction pages and data may be copied between transaction pages by dragging from a data item to be copied to the receiving transaction page.

In general, in another aspect, the invention features a trading computer. The trading computer includes a screen that can operate as both an output display and an input digitizer. The trading computer also includes a processor coupled to the screen and to a memory. The memory includes instructions for causing the processor to form and display ticker pages on the screen. Each ticker page includes trade order information for a different negotiable item. A currently displayed ticker page may be determined based on a selection of a ticker page selection elements. The ticker page selection elements may be rendered as page tabs that are displayed at a different output display location. The computer memory also may include additional instructions for implementing other methods of the invention.

Implementations may include one or more of the following advantages. A broker can access and input trading order information using an interface that is easy to navigate and that provides for a variety of trading operations. The interface can flexibly provide information for a variety of items being traded. Other features, objects, and advantages of the invention will be apparent from the description, drawings, and claims that follow.

DETAILED DESCRIPTION

Figure 1:
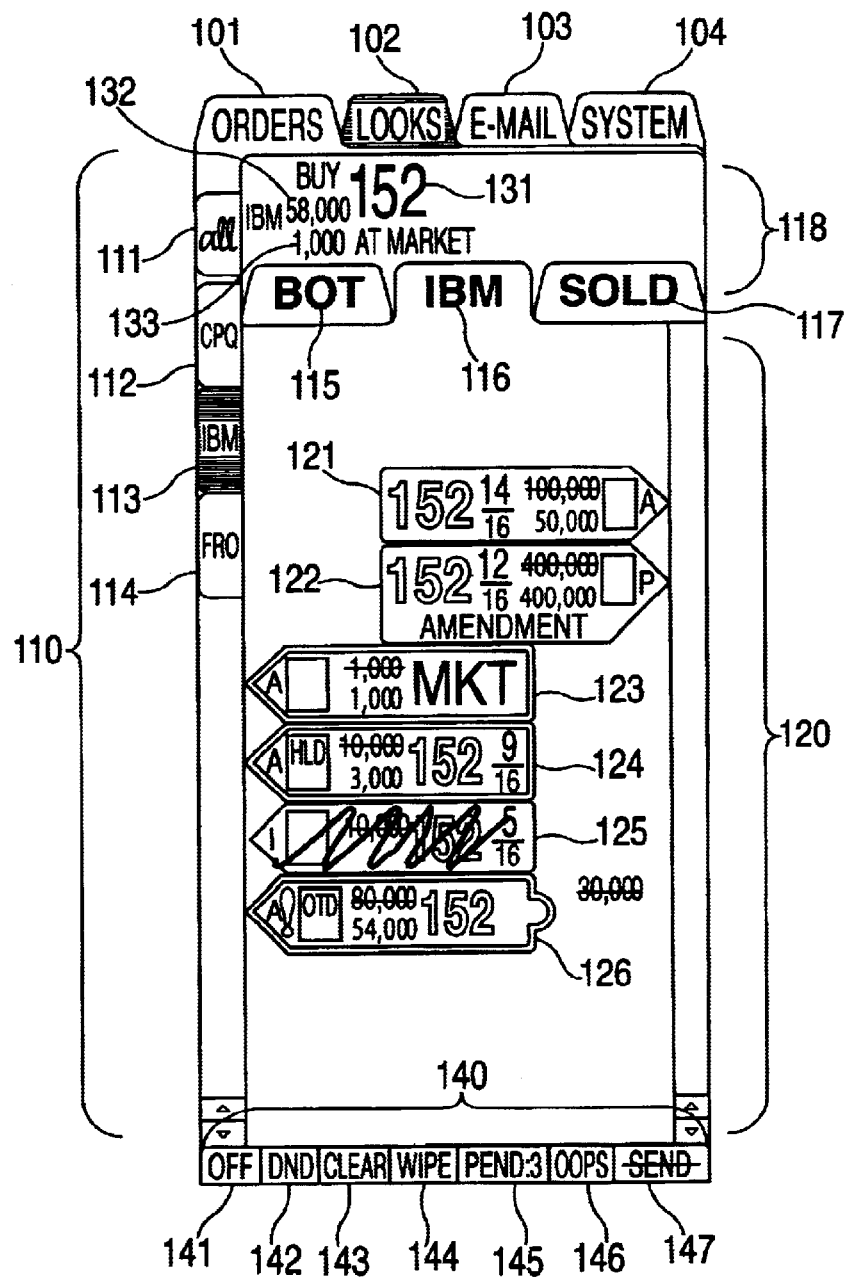
FIGS. 1–12 show interface displays generated by a handheld trading computer.

FIG. 1 shows a display image of a hand-held handheld trading computer interface. The image 100 can be displayed on a computer output screen that also operates as a digitizer, thereby allowing data to be input to the handheld trading computer by writing on the display screen with a stylus. A handheld trading computer interface may use the display screen/digitizer to implements a trading system interface wherein trading requests and data objects are presented using graphically rendered "pages." Brokers can write on these pages to execute trades, input trading information, and access other handheld trading computer functions.

The handheld trading computer may be organized around a series of command pages. The command pages may be used to partition the handheld trading computer's functions and trade related data into different areas that each contains related operation controls and data. Command pages may, in turn, contain nested pages that further organize operations and data. In the implementation described herein, a handheld trading computer includes four command pages: an "orders" page, a "looks" page, an "E-mail" page, and a "system" page. The orders page can be used to access functions that display and execute buy and sell transactions, the looks page can be used to access functions that exchange "looks" requests and replies with off-floor brokers, the "E-Mail" page can be used to access messaging functions, and the "system" page can be used for other functions and handheld trading computer configuration.

Figure 2A:
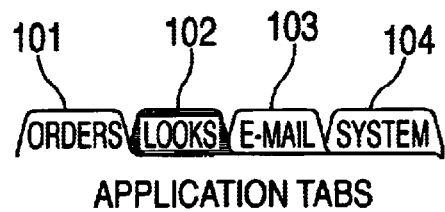

A broker can select either the orders, looks, e-mail, or systems page by tapping on a corresponding page tab 101–104 (FIGS. 1 and 2A) with an input stylus. FIG. 1 shows the main "orders" page 110 that is displayed when the orders tab 101 is tapped. The orders page 110 contains a series of nested ticker pages. Each ticker page displays buy and sell order information that has been sent over a wireless network connecting the handheld trading computer to another computer or computers (trading server computers) which may be operated by off-floor traders or clerks. In general, each ticker page is associated with a single negotiable instrument and organizes all of the buy and sell orders for that negotiable instrument. A broker may interact with information displayed on a ticker page to transact trades for the instrument associated with the ticker page, as well as to display data about that instrument. In a stock trading implementation, each ticker page may be accessed by tapping on a tab 112–114 that is labeled with a stock market ticker symbol. For example, FIG. 1 shows a ticker page for trading "IBM" stock displayed when the "IBM" tab 113 is tapped. As shown, the nested "IBM" ticker page occupies substantially all of the display area of the "orders" page 110 (the remaining area of the orders page 110 is occupied by a column of page tabs 111–114). When a tab 111–114 is selected (tapped on), display characteristics for the selected tab (such as font, color, and shading) may be changed to indicate the particular ticker page being shown in the foreground of the orders page.

The order page 120 may include an "all" ticker object 111. When the "all" ticker object 111 is selected, a special all orders page is displayed. The all orders page lists the ticker objects from all of the other single-ticker pages. The "all" ticker object label may use a special font, such as a script font, to distinguish the "all" object from an equity having the ticker symbol "all."

Figure 2B:
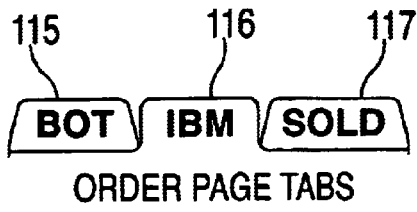

A floor broker may want to limit ticker page information so that, at a particular point in time, only buy order transaction information, or only sell order transaction information, or both buy and sell order transaction information is displayed. The broker also may need to be able to quickly switch between these different information displays. Each ticker page can include a series of nested order pages that can be selected to determine whether only buy transaction, only sell transaction, or all transaction information is displayed. Order page tabs 115–117 (also shown in FIG. 2B) may be used, respectively, to select the buy order transaction (BOT) page, the "all order" transaction page, or the sold order transaction page. In FIG. 1, the "all transactions" order page 120 is shown.

An order list page (e.g., page 120) displays a list of buy and sell orders represented by order objects 121–126. An order object 121–126 is created when a buy or a sell order is received by the handheld trading computer over the wireless network that connects the handheld trading computer to an off-floor trading system. A broker can make a trade by interacting with other brokers or a specialist and then interact with objects 121–126 (e.g., by writing on the object with a stylus) to record trade parameters. The handheld trading computer can use different visual characteristics, such as shapes, fonts, and color, to emphasize properties of order objects. For example, as shown in FIG. 1, buy order objects may be in the shape of a left-pointing arrow 123–126, while sell order objects may be in the shape of a right-pointing arrow 121–122. Thus, buy order objects point in the direction of the buy order page tab 116 and sell order objects point in the direction of the sell order page tab 117.

Figure 3:
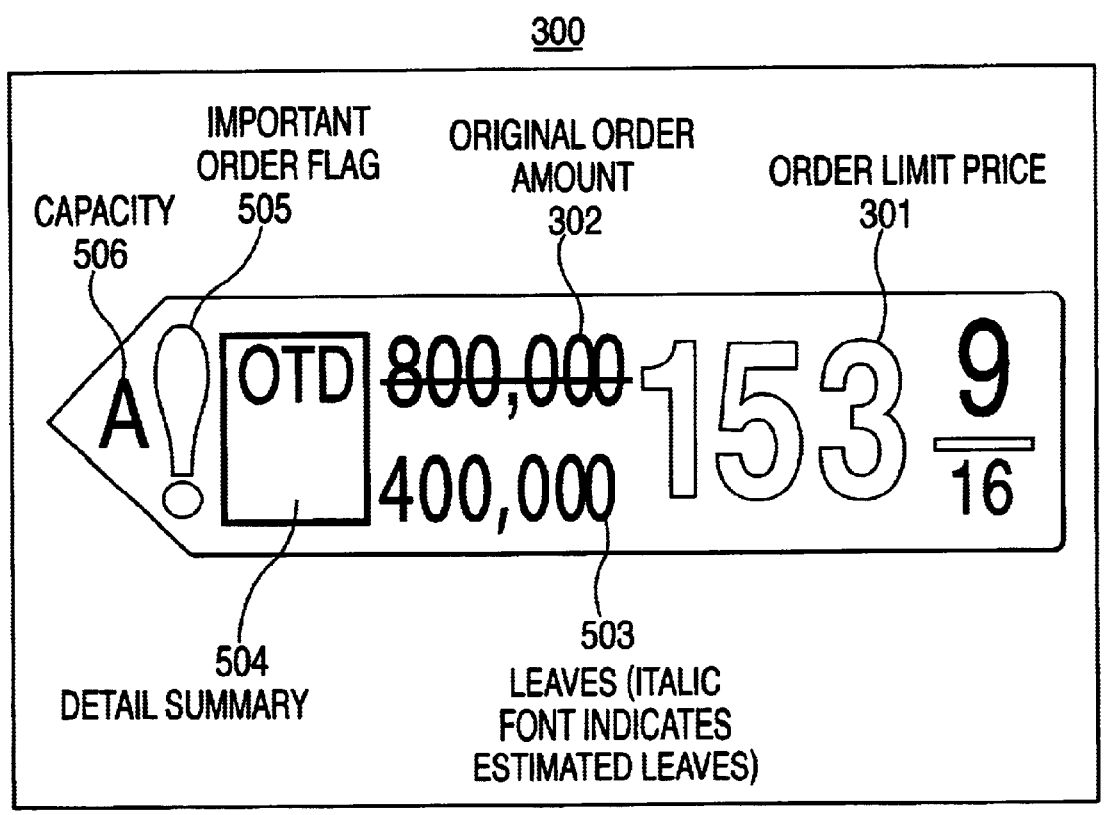

FIG. 3 is a detailed view of a buy order object 300. An order object 300 conveys critical information needed by a broker to transact a trade. This information includes a price 301 and order size information 302–303. The price 301 may specify a dollar amount ("153 9/16") for a buy limit order or may specify a symbol (such as "MKT") to indicate that the order is a market order. The object 300 also displays quantity information. Brokers may complete an order using a number of separate trades, each for a part of the full order size. Consequently, a broker may be interested in both the original order size and the portion of the order that remains unfulfilled (the unfulfilled portion may be referred to as the "leaves" size). The original order size and leaves size may be displayed in separate fields 302 and 303. The original size field 302 may use a special font, such as a strike-through font, to clearly indicate that a portion of the original order size has been filled and that only the leaves mount 303 remains. The leaves quantity 303 also may use different display characteristics to identify different characteristics associated with the remaining leaves order. For example, an italicized font may be used to indicate that the leaves quantity is an estimated leaves quantity, and a non-italicized font may be used to indicate confirmed quantities. Order objects can be sorted for easier reference. For example, in FIG. 1, sell limit orders are listed first in descending price order, then "sell at market" orders sorted from least to most recent, then "buy at market" orders sorted from most recent to least recent, followed by buy orders, in descending price order. Other sorting orders may be used.

The order object 300 may display other information. For example, a capacity code area 306 may contain a symbol or a letters (e.g., "A", "I", "P", or "O") indicating whether the broker is acting in an agency capacity ("A"), individual capacity ("I"), principal capacity ("P") or other capacity ("O") and an order priority area 305 may display an exclamation mark or other symbol to indicate that the order is a high priority order. A high priority order may be further identified by an elongated order object. For example, 126 is slightly longer than order objects 121–125, thus indicating that the order associate with object 126 is of higher priority than orders associated with objects 121–125. An order's priority may be changed by the broker using an input stylus. To mark an order as high priority, the broker may drag the stylus in a horizontal direction starting from a point inside the order object toward the pointed end of the order object (e.g., right to left for a buy order object 123–126, left to right for a sell order object 121–122). In response, the handheld trading computer displays a lengthened order object and/or the high priority indicator ("!") 305. The high priority indicator ("!") may be removed by making a horizontal stroke in the opposite direction (i.e., from near the pointed end of the order object toward the flat end). Order priority may also be toggled from high to regular priority by tapping in the priority indicator area 305. When an order object has been marked high priority, the tab 112–114 of the corresponding ticker page also may be marked with a priority indicator ("!").

Figure 4:
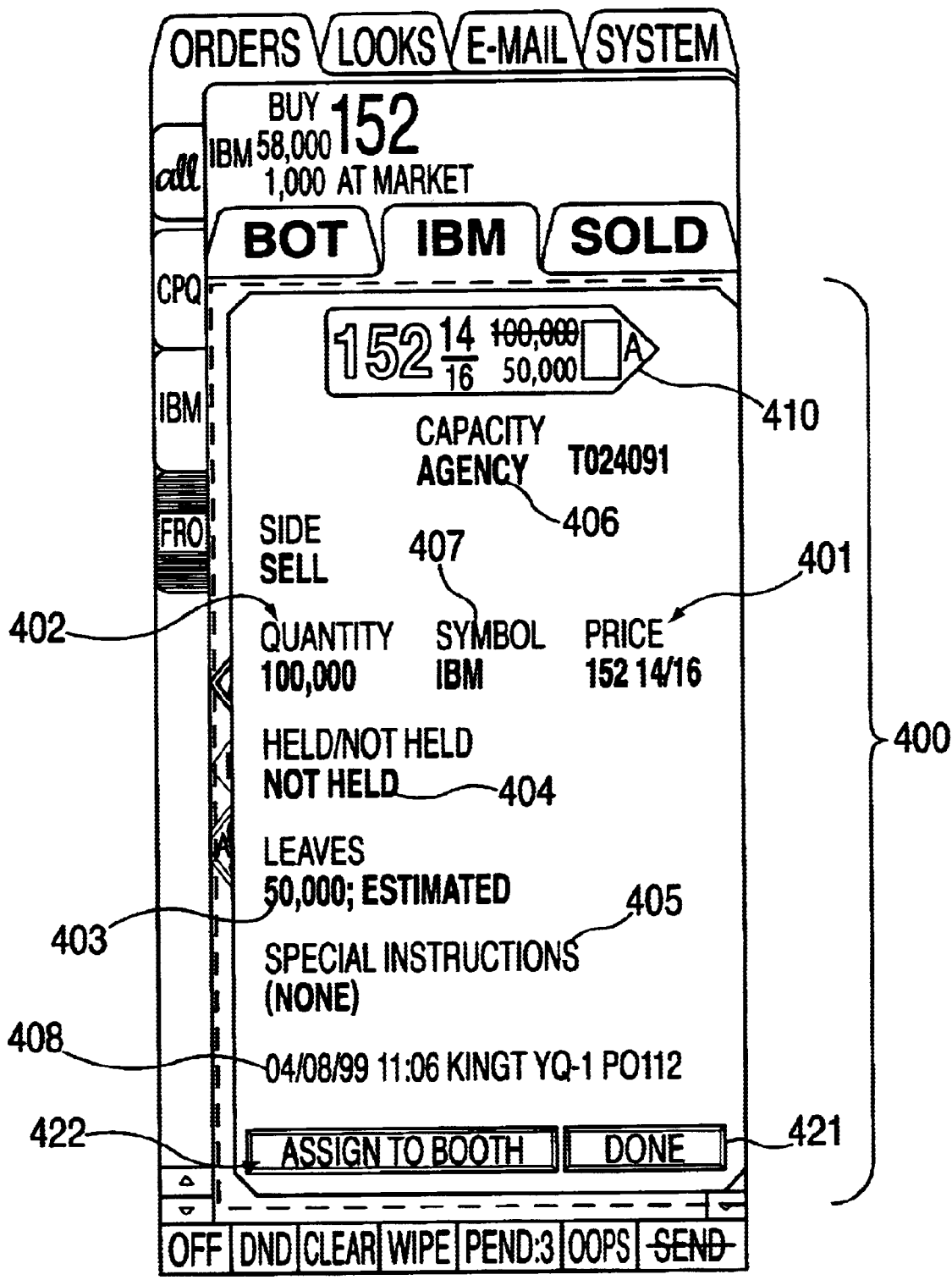

An order object 121–126 may contain an order detail area 304. The order detail area 304 may include codes that summarize additional order properties. The broker may tap in the order detail area 304 to display a order detail page 400 (FIG. 4). The order detail page expands upon the information in the detail area 304 and otherwise more fully explains order details. The order detail page 400 may display its associated order object 410 as wells as details fields 401–407. Fields 401, 402, 403, and 406 may repeat information conveyed by order object fields 301, 302, 303, and 306, respectively. The order detail page also indicates additional information such as a date and time associated with the order 408, whether the order is held or not held 404, and any special instructions 405 that are associated with the order 404. After reviewing detail information, the broker can tap on the "Done" button 421 (or other page closing symbol) to close the detail page 400 and return to an order page 120.

When an order is received at the handheld trading computer, the broker may display the detail page 400 and review the detail information to determine whether the broker can handle the order. If the broker can handle the order, he or she may tap on the button 421 to accept the order (prior to this acceptance, button 421 may be labeled "Accept"). Alternatively the broker may reject the order and return it to the off-floor clear or trader by tapping on the "Assign to Booth" button 422. When an order has been assigned to booth (via button 422), its corresponding order object may appear in a "ghosted form" (e.g., order object 125) or be removed from the page 120.

When negotiating trades, a broker may be able to obtain advantages by dealing in volume. Consequently, the broker may want to know aggregate order information giving a total order size and an appropriate price for a group of orders. The handheld trading computer displays aggregate order information in a top section 118 of a ticker page. The aggregate order information is determined by summing order size and price information for selected order objects. To select the order objects, the broker taps inside the objects (except in areas reserved for other functions, e.g., areas 304–305, near the pointed "nose" of the object, and near the flat "tail" of the object). Selected objects may be displayed with a enhanced border or other display attribute to indicate selection, while unselected objects may display attributes indicating they are not selected (compare, for example, selected objects 123–124, 126 with unselected objects 121–122, 125). An aggregated buy price 131 may be the lowest buy price of the selected buy limit orders. For example, the aggregated buy price determined when buy order objects 121–122, 125 are selected is the price associated with object 126 ("152"). An aggregated limit order quantity value 132 is also displayed. The limit order value 132 is determined by summing leaves quantity fields (i.e., field 303) for selected limit order objects (e.g., order objects 124 and 126). If market order objects (e.g., object 123) are selected, the market order leaves values are separately summed and displayed in field 133. Sell order information may be similarly aggregated and displayed in the right-hand side of area 118. The aggregate sell order limit price may be set to the highest limit price of selected sell orders. For example, if sell order objects 121–122 were selected, the aggregate sell order price would be 152 14/16 and the aggregate sell order value would be 450,000.

Figure 5A:
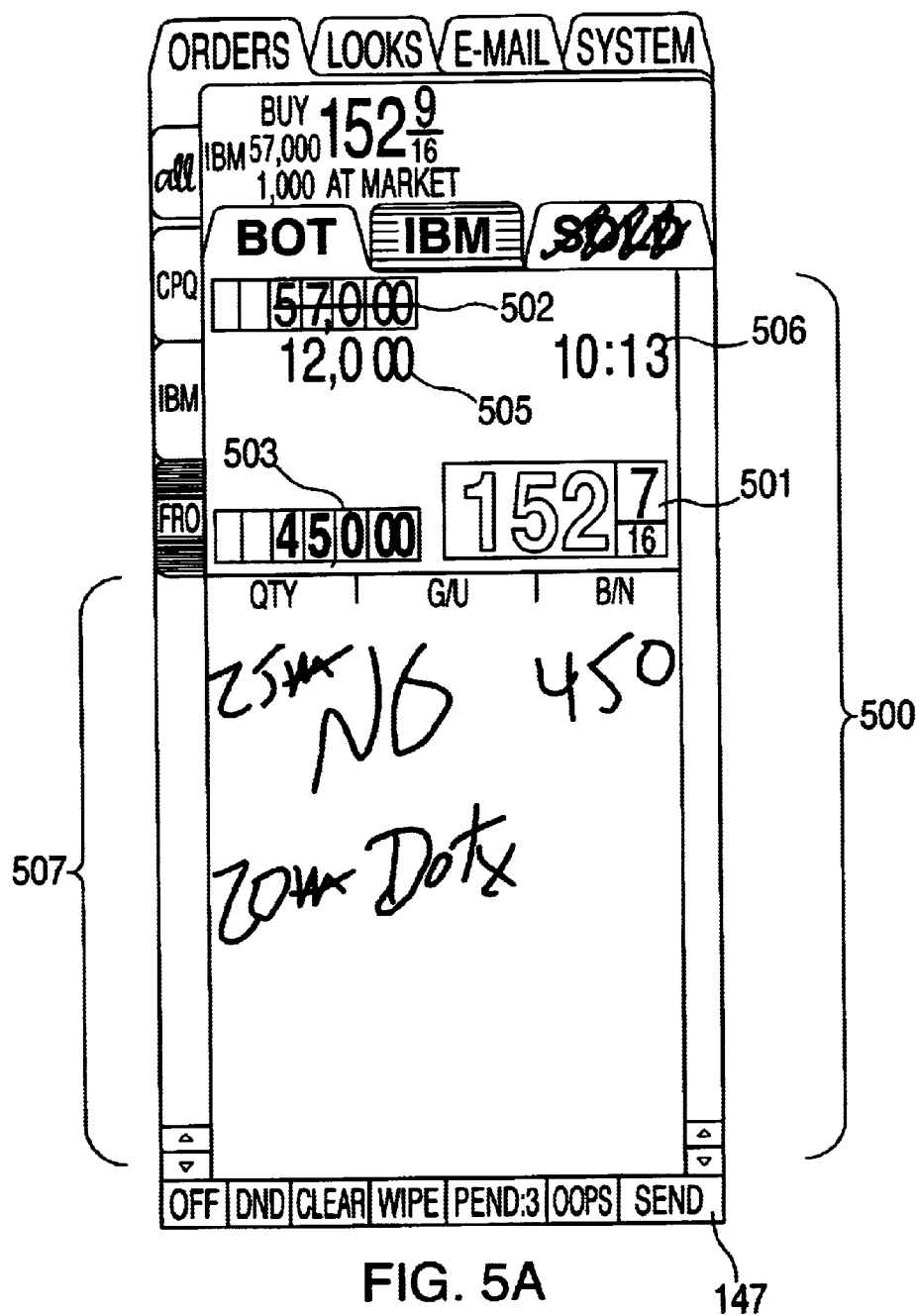
Figure 6:
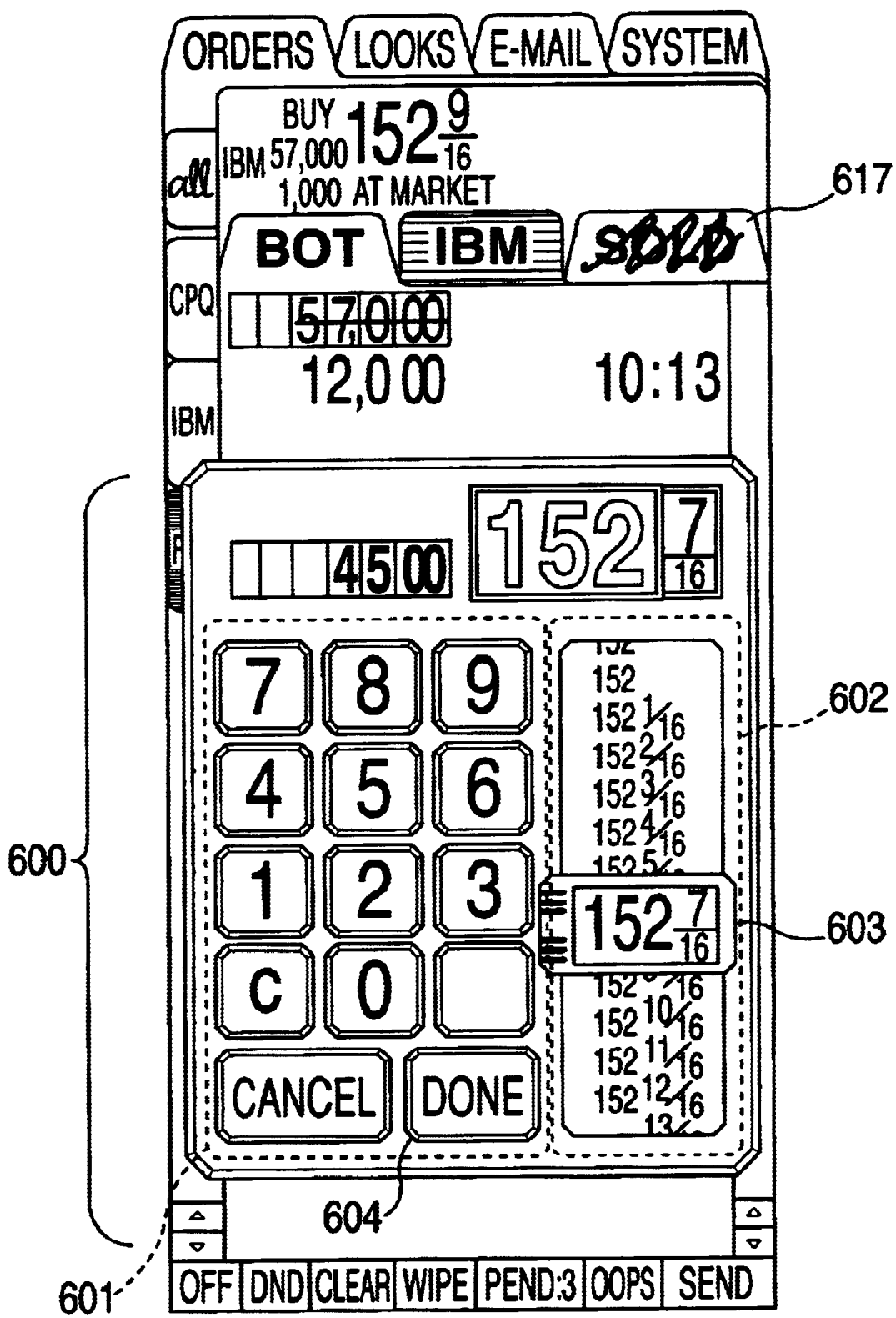
Figure 7:
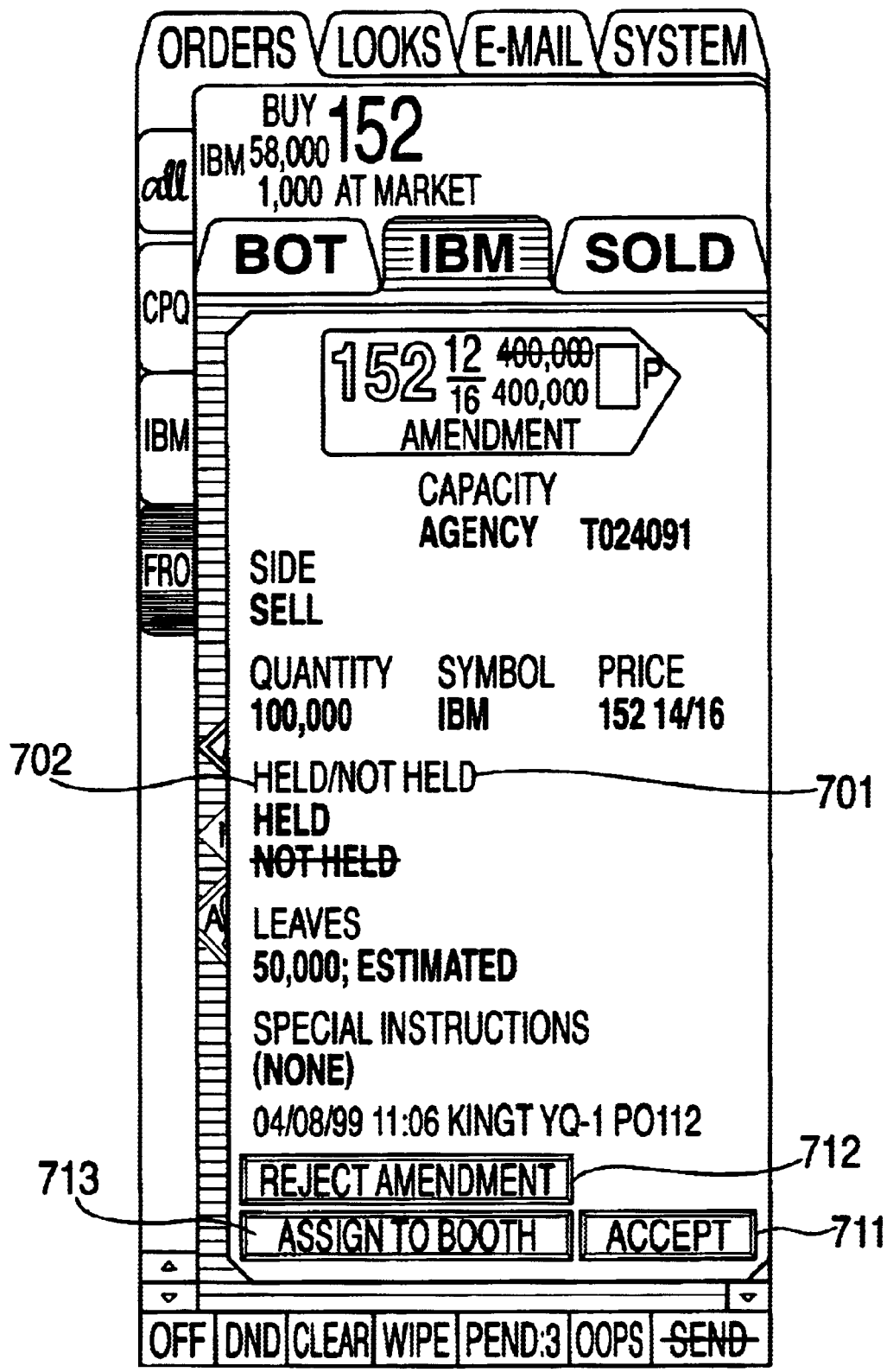
Figure 8:
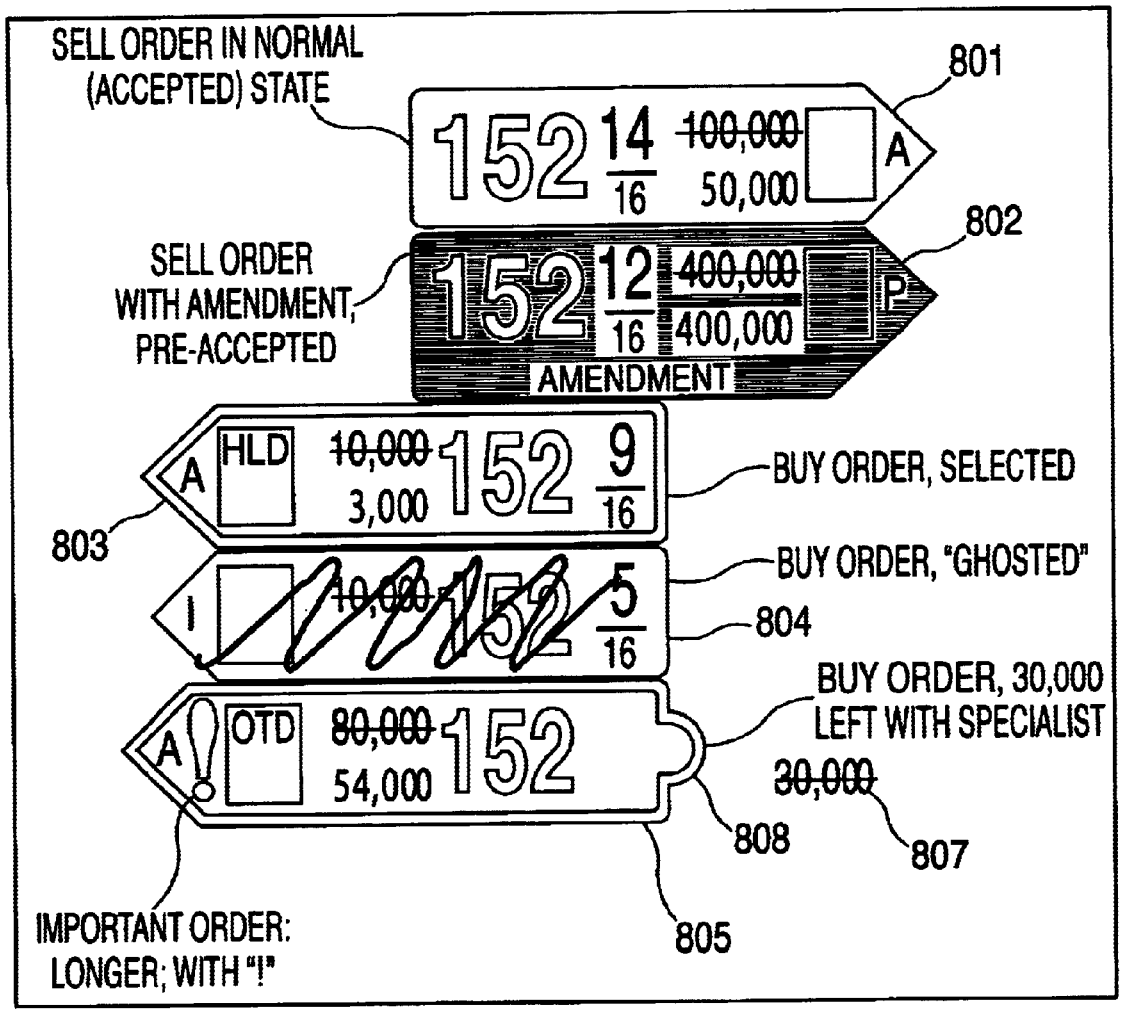
Figure 9:
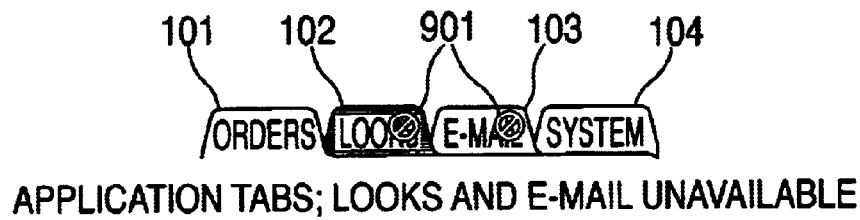

After reviewing order details and determining pricing, the broker may interact with other brokers and trade specialist to execute the orders. When the broker has executed a trade, the broker can record the executed trade using a buy order transaction page 500 (FIG. 5A). To access the buy order transaction page 500, the broker taps on the buy order transaction page tab 115. If buy order objects are selected when the buy order transaction page 500 is displayed, a default price is entered in the field 501 and a leaves size is entered in the field 502. The default price 502 may match (be copied from) the value in price field 131 and the default size 502 may match (be copied from) the aggregate leaves size 132. The broker may then enter the size of the trade in the execution quantity field 503 and may change the price value 501. A broker can enter or change a value in a numeric field (i.e., fields 501, 503), by dragging a stylus over the field in an upward direction to increment the field value, and in a downward direction to decrement the field value. Alternatively, the broker can tap on the field to display a detail entry page 600 (FIG. 6). The detail entry page 600 may display a numeric keypad image 601 having keys images that can be tapped to enter a value (e.g, the quantity 503) and a sliding scale image 602 with a draggable window 603 that can be dragged to change a value (e.g., price 501). After appropriate values have been entered, the broker can tap the done button 604 to return to the page 500. In some cases, the broker may want to add additional notes on an order transaction page. Notes may be entered by writing in a digital ink area 507 with the stylus. The digital ink area 507 allows for free-form entry of data by capture of an image of stylus strokes over the area 507.

When the broker has finished entering transaction information on the page 500, a send button 147 can be tapped to send the transaction information to the off-floor trading server. When the send button is tapped, the handheld trading computer will update leaves values for the order objects that were selected when the transaction was entered. To update the order objects, the handheld trading computer locally allocates the quantity value 505 among the selected order objects and decrements each order object's leaves values by the amount allocated to the object. Allocation of the quantity 505 may be performed in a number of different ways. In a first-come-first-served implementation, an order time stamp is used to determine the earliest orders, and the full leaves value of early orders is satisfied before the leaves values of later orders. In a proportional allocation implementation, the quantity value 505 is allocated proportionally based on each objects leaves value. In an equal allocation implementation, the quantity 505 is equally allocated to order objects up to each objects maximum leaves size (any excess value being re-allocated among remaining order objects). In some implementations, the handheld may subsequently receive actual allocation values from the off-floor trading server. Actual allocation values may be used to override the locally allocated quantities and may result in a recalculation of leaves amounts on the affected order objects. When an order has been completely filled (that is, its leaves value is reduced to zero), the order object representing that order can be removed from its associated ticker page.

Figure 5B:
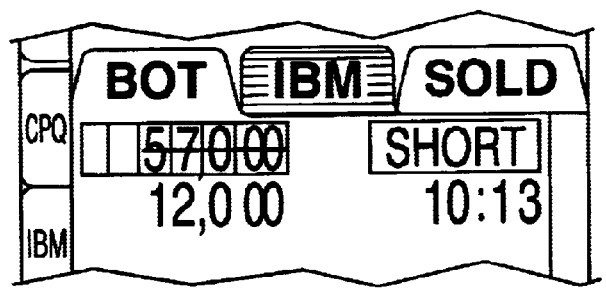

A broker can also use the handheld trading computer when executing sell orders. Sell orders are entered from a sell order transaction page that is displayed when tab 117 is selected. The sell order transaction page includes price, quantity, time stamp and digital ink fields substantially identical to corresponding fields 501–507 on the buy order transaction page 500. In addition, the sell order transaction page contains a field 508 (FIG. 5B) indicating the type of sale transaction (i.e., a long, short, or short exempt sale). The broker may change the value in field 508 by dragging on the field with a stylus. When the sell order transaction page is displayed, a default price value may be determined by the highest sell order value for selected sell order objects.

An order object may be removed from a ticker page when it has been completely fulfilled. A record of the order object may be obtained using a history function on the system page (discussed below). When all orders for a given ticker symbol have been removed from the device (and there are no partially entered executions) the associated ticker object may be removed from the display screen 100. When there are too many ticker objects to fit in the ticker objects area, scroll buttons may appear at the bottom of the ticker object list to allow the user to scroll up and down through ticker objects.

After an order has been received by the handheld trading computer from a trading server, the trading server may send instructions to amend the order. An amended order may be represented by a order object 122 bearing the label "Amendment" (other amendment indicators may also be used). A detail page 700 associated with an amended order object 142 may indicate both terms currently in effect (using, for example, a normal font and information placement), and may indicate terms that have been amended using a font, such as a strikeout font. For example, page 700 indicates that the order associated with the object 142 has been amended from a "Not held" state to a "Held" state (indicated by labels 701 and 702, respectively). The amended order page 700 can receive user input allowing a user to accept an amended order, reject the amended order, or assign the amended order to the booth. These features may be accessed through the "Accept" 711, "Reject Amendment" 712, and "Assign to Booth" 713 buttons.

A broker may want to leave all or part of an order with a specialist for execution. To indicate that all or part of an order has been left with a specialist, the broker taps on or drags the tail end of an "ordinary" order horizontally away from the order's point. If the order taps on the tail end, the handheld trading computer may display a keypad allowing the broker to tap in the size left with the specialist (which is then displayed in field 807); if the broker drags on the tail end, the size amount 807 may be incremented depending on the distance that a stylus is dragged. The broker may subsequently re-drag on the object tail or tap on the field 807 or object tail to modify the size left with the specialist. When part of an order has been left with a specialist, a tail of an order object may display with a rounded cap 808.

A broker can execute cross trades by executing a buy order and a corresponding sell order. To rapidly enter a cross trade, a broker can copy price and quantity information between a buy order transaction page and a sell order transaction page by dragging displayed values (e.g. timestamp, digital ink, quantity, and price) from a displayed page to the page tab of the receiving page. For example, a user may drag the stylus from the price field 501 on a buy order transaction page 500 to the tab 117 to copy the value in the buy price field to a sell order transaction page. When values are dragged between buy and sell order transaction pages, a partially filled-out order execution will be created on the receiving page. An asterisk or other display symbol may be added to the receiving page's tab to indicate that there is a partially filled-out execution on that page.

In addition to the display characteristics already described, the handheld trading computer may convey additional information to the broker using a variety of visual queues and display symbols. For example, a warning symbol, such as an asterisks, may be displayed on or near a page tab, order object, value field, or other display item if there is a warning message associated with the item. The broker may tap on the warning symbol to display the associated warning message. If an warning symbol appears anywhere on a buy or sell execution page, a warning symbol may also appear on the SEND button 147. Warning symbols may also appear on page tabs if a page or nested sub-page has a warning symbol on it.

Display characteristics (e.g., font, color, shading, and displayed symbols) can change to indicate that a page contains updated information or requires user input. For example, the use of dark shading on the "Looks" tab 102 indicates that the looks page has changed since it was last viewed. If data or a function is unavailable, an unavailability symbol may be displayed on or near an the associated field, object, page, or page tab. For example, the circled slash symbol 901 displayed on a page tabs 102 and 103 indicates that the looks and e-mail functions are unavailable. In some implementations, a scribble may be added to unselected tabs to emphasize their unselected state (e.g., the scribble symbol on tab 617 (FIG. 6) emphasizes that broker is accessing a buy order transaction page rather than a sell order transaction page). Different display characteristics also can indicate different order priorities.

Different display characteristics may indicate different states. For example, the display characteristics of sell order object 801 may indicate a normal sell order that has been accepted by the broker (i.e, accepted by selecting an 'accept' button 421 on a detail display page 400), the darker background of sell order object 802 may indicate a sell order object with amendments that has not yet been accepted, the dark border around buy order object 803 represents a buy order that is selected, the faint outline and background color of buy order object 804 represents a "ghosted" buy order (i.e., one that has been 'assigned to booth' via detail page button 422), and the display style of object 805 represents an important buy order wherein a buy quantity of 30,000 (field 807) may have been left with a specialist trader. Additional object styles may be used for other order types, such as sell short and sell short an exempt orders. In some implementations, tapping in the ghosted order object 804 may remove it from the display.

The handheld trading computer may include additional interface controls. For example, a context-sensitive toolbar 140 may be displayed at the top or bottom of the screen. A broker may tap on toolbar buttons to turn the system off (button 141), set the system in "do not disturb" mode to preventing additional orders or look requests from being sent to the device (button 142), clear a page or input field (button 143), erase digital ink (button 144), display a pending order list (button 145), indicate that a recently entered trade was in error (button 146), and send an executed order to the booth (button 127). Different sets of buttons may be displayed depending on the current page being accessed and/or other factors affecting the handheld trading computer's state.

Figure 10:
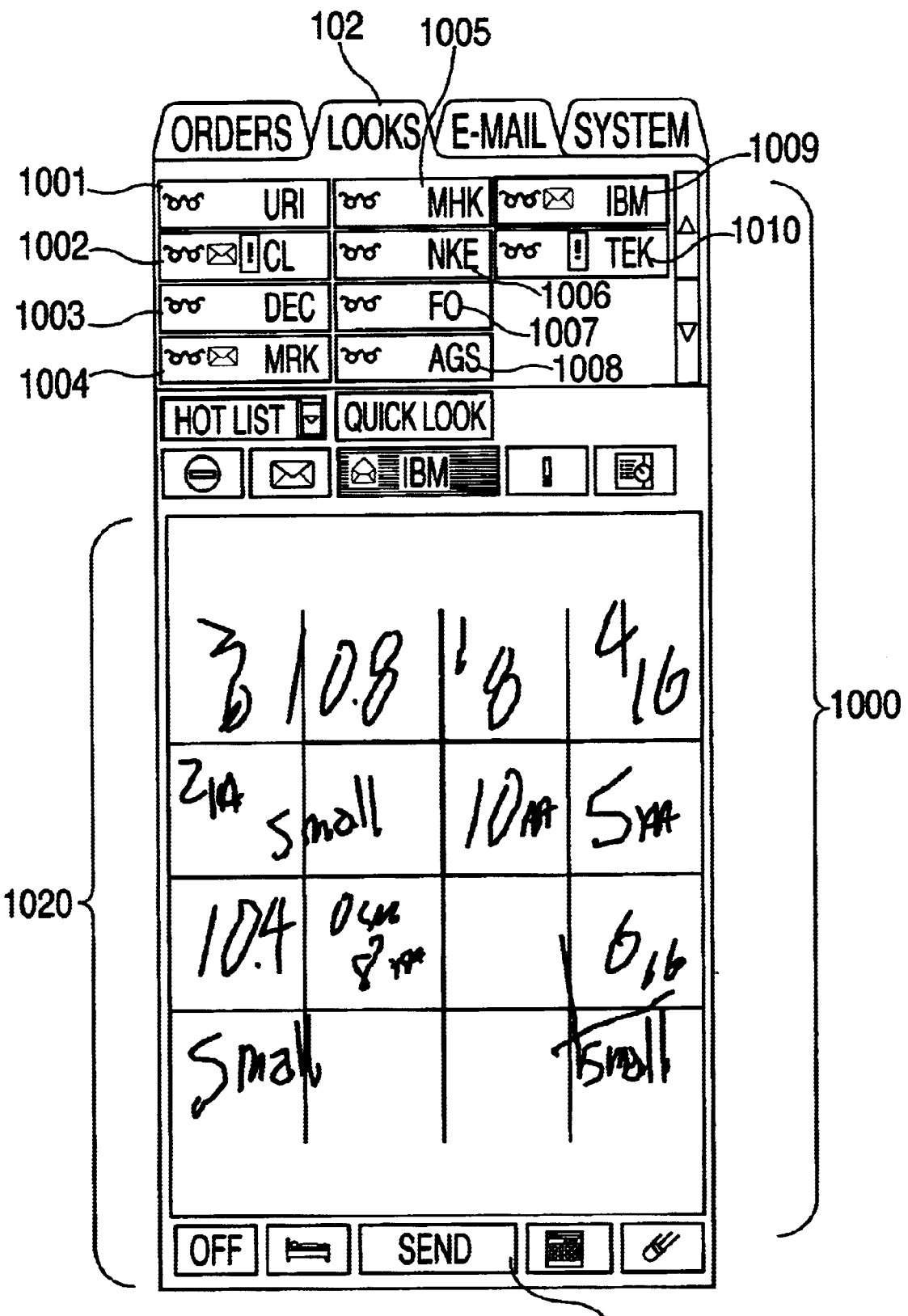

In addition to trades, brokers may also be asked to process "looks" request. A looks request is sent to the handheld trading computer from a trading server when an off-floor trader, clerk, or other individual wants to get a feel for the current trading activity associated with a particular item being traded. The broker can cap on a looks page tab 102 to display the main "looks" page 1000 (FIG. 10) on which look request are displayed and processed. Look request are displayed as look objects 1001–1010 on looks page 1000. Each of the looks objects identifies a ticker symbol for which pricing information is being requested. To enter "look" information, the broker selects a look object 1001–1010 (e.g., by tapping on it) and the writes in the digital ink area 1020. A bit mapped image of the digital ink area 1020 may be returned to the trading server when the broker taps on the send button 1023.

Figure 11:
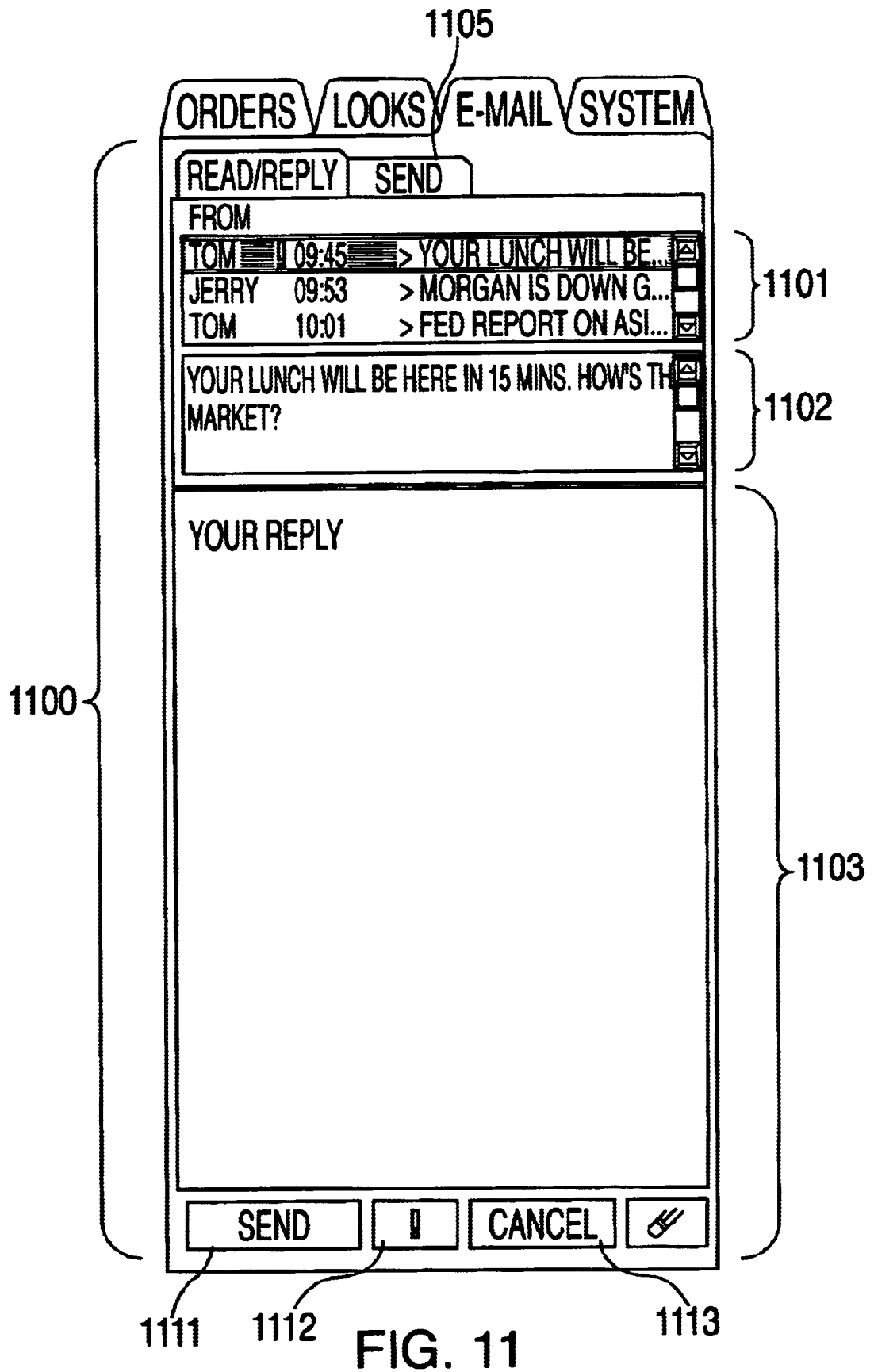

The handheld trading computer can provide additional data and messaging services to the broker. For example, e-mail page 1100 (FIG. 11) provides an interface to an electronic mail system. A broker can access the e-mail page 1100 by tapping on tab 103. E-mail messages received at the handheld trading computer can be listed in message header area 1101. The broker may tap on listed message in area 1101 and the text of the message will display in the message text area 1102. Responses may be composed in digital ink area 1103 and sent by tapping on the send button 1111. A broker can also tap on the send tab 1105 to originate a message. Messages may be canceled by tapping on button 1113 and marked high priority by tapping on button 1112.

In some implementations, digital ink messages can be converted to characters using handwriting recognition software. For example, an e-mail message may be "written" in digital ink area 1103 and converted to text characters prior to being transmitted from the handheld trading computer. A keyboard can also be displayed, thus allowing a broker to enter data by tapping letters.

Figure 12:
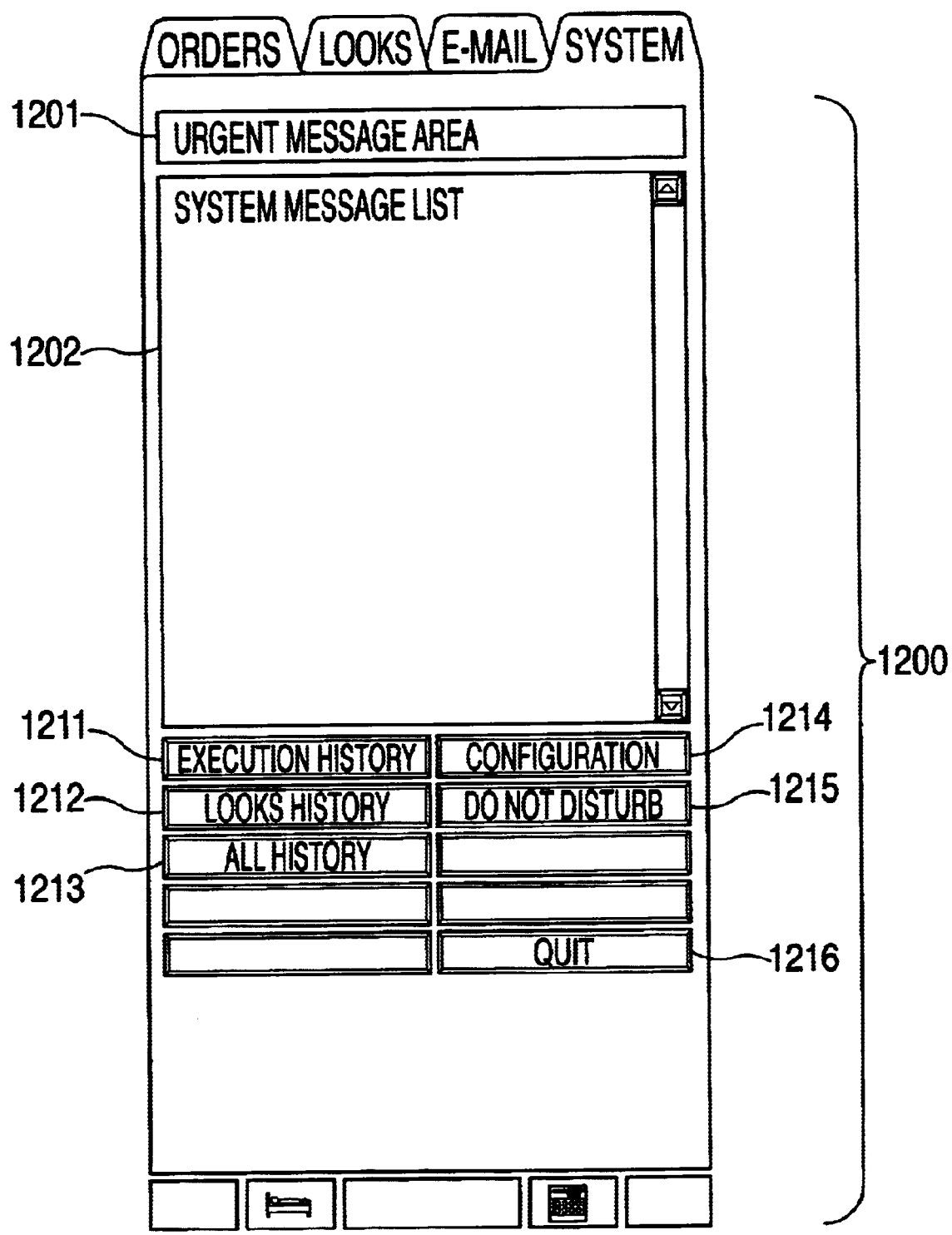

Handheld trading computer implementations may have additional main pages (e.g., system page 1200 (FIG. 12)) for maintenance, configuration, tracking, and other functions. The system page 1200 may track and display system alert messages, including messages generated by the handheld trading computer and messages received from a trading server. Critical alert messages may be displayed in an urgent message area 1201, while non-urgent messages may be displayed in a system message list area 1202. The system page may include buttons 1211–1213 used to access history functions. For example, a broker can list all executed orders by tapping the execution history button 1211, can list all look messages and responses by tapping on button 1212, and can list all relevant history information by tapping on button 1213. System configuration features may be accessed via button 1214 and a do not disturb mode may be set via button 1215.

The invention may be implemented using a palm-sized computer, such as a Casio PA2400 hand-held computer. Other hand held computers, such as a 3Com Palm Pilot, or other Windows CE based palm-sized devices also can be used. Apparatus of the invention can be implemented in digital electronic circuitry, or in computer hardware, firmware, software, or in combinations of them as well as in a computer program product tangibly embodied in a machine-readable storage device for execution by a programmable processor. Method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, display characteristics shown herein may be changed. Accordingly, other embodiments are within the scope of the following claims.

What is claimed is:

1. A computer implemented method for facilitating trading on a trading floor, the method comprising:
   forming a ticker page on a wireless handheld computer, wherein the ticker page is associated with a unique negotiable item;
   forming a plurality of orders on the ticker page, wherein each order comprises order details;
   selecting a plurality of orders on the ticker page; and
   displaying aggregate order information for the selected orders.

2. The method for facilitating trading on a trading floor of claim 1 additionally comprising the step of modifying the aggregate order information by selecting an additional order or deselecting an order previously selected.

3. The method for facilitating trading on a trading floor of claim 2 wherein the aggregated order information displayed comprises an aggregated buy price comprising the lowest limit price of selected buy orders.

4. The method for facilitating trading on a trading floor of claim 1 wherein the aggregated order information displayed comprises an aggregated sell price comprising the highest limit price of selected buy orders.

5. The method for facilitating trading on a trading floor of claim 1 wherein the aggregated order information displayed comprises an aggregated limit order quantity.

6. The method for facilitating trading on a trading floor of claim 1 additionally comprising the steps of:
recording an executed trade on the wireless handheld computer; and
modifying the aggregated order information responsive to the executed trade.

7. The method for facilitating trading on a trading floor of claim 1 additionally comprising the steps of:
editing order details; and
modifying the aggregated order information responsive to the edited order details.

8. The method for facilitating trading on a trading floor of claim 1 additionally comprising the step of forming a display attribute to indicate selection of an order.

9. The method for facilitating trading on a trading floor of claim 8 wherein the display attribute comprises a highlighted border.

10. A computer implemented method for facilitating trading on a trading floor, the method comprising:
forming a ticker page on a wireless handheld computer, wherein the ticker page is associated with a unique negotiable item;
forming an order on the ticker page, wherein the order comprises order detail comprising a numerical value; and
modifying the numerical value in response to a stylus being dragged over an interactive area of the wireless handheld computer.

11. The method of claim 10 wherein the interactive area comprises a database field comprising the numerical value displayed on a display screen.

12. The method of claim 10 wherein the modification of the numerical value comprises incrementing the numerical value responsive to stroking in a predetermined direction.

13. The method of claim 12 wherein the modification of the numerical value comprises decrementing the numerical value responsive to stroking in a predetermined direction that is different than the predetermined direction for incrementing the numerical value.

14. A computer implemented method for facilitating trading on a trading floor, the method comprising:
forming a ticker page on a wireless handheld computer, wherein the ticker page is associated with a unique negotiable item;
forming a plurality of orders on the ticker page, wherein each order comprises a request to trade a quantity of the negotiable item and a leaves value;
recording a transaction on the wireless handheld computer, wherein the transaction comprises a quantity of the negotiable item traded; and
allocating at the wireless handheld computer the quantity of the negotiable item traded amongst the plurality of orders.

15. The method for facilitating trading on a trading floor of claim 14 additionally comprising the steps of:
associating an order time stamp wherein the time stamp indicates an earliest order; and
satisfying a full leaves value of the earliest order before allocating the quantity of negotiable items to leaves values of later orders.

16. The method for facilitating trading on a trading floor of claim 14 wherein the quantity of the negotiable item is allocated proportionally according to each the quantity of each leaves value.

17. The method for facilitating trading on a trading floor of claim 14 wherein the quantity of the negotiable item is allocated equally amongst all orders.

18. The method for facilitating trading on a trading floor of claim 14 wherein the quantity of the negotiable item is allocated equally amongst selected orders.

19. The method for facilitating trading on a trading floor of claim 14 additionally comprising the steps of:
receiving a reallocation instruction from a computer remote to the wireless handheld computer;
reallocating the quantity of negotiable items according to the reallocation instruction; and
calculating a leaves value for each order affected by the reallocation instruction.

20. The method for facilitating trading on a trading floor of claim 14 additionally comprising the steps of:
receiving a suggested reallocation instruction from a computer remote to the wireless handheld computer;
accepting the reallocation instruction;
reallocating the quantity of negotiable items according to the accepted reallocation instruction; and
calculating a leaves value for each order affected by the reallocation instruction.

21. The method for facilitating trading on a trading floor of claim 14 additionally comprising the steps of:
receiving a suggested reallocation instruction from a computer remote to the wireless handheld computer; and
rejecting the reallocation instruction.

22. The method for facilitating trading on a trading floor of claim 14 additionally comprising the step of removing an order from the ticker page when the order is completely filled.

23. A computer implemented method for facilitating trading on a trading floor, the method comprising:
forming a ticker page on a wireless handheld computer, wherein the ticker page is associated with a unique negotiable item;
forming an object on the ticker page, wherein the object represents an order comprising a request to trade a quantity of the negotiable item; and
interacting with the object to leave a size amount of the order with a specialist for the negotiable item.

24. The method for facilitating trading on a trading floor of claim 23 wherein the object comprises a tail portion and interacting with the object comprises tapping on the tail portion to display a keyboard which can be used to enter the size amount left with the specialist.

25. The method for facilitating trading on a trading floor of claim 23 wherein the object comprises a tail portion and interacting with the object comprises dragging a stylus on the tail portion such that the size amount to be left with the specialist is incremented in proportion to the distance the stylus is dragged.

26. A computer implemented method for facilitating trading on a trading floor, the method comprising:
forming a ticker page on a wireless handheld computer, wherein the ticker page is associated with a unique negotiable item;
forming an object on the ticker page, wherein the object represents an order comprising a request to trade a quantity of the negotiable item; and transforming the visual characteristics of the object according to the type of order represented.

27. The method for facilitating trading on a trading floor of claim 26 transforming the visual characteristics comprises displaying an arrow pointed in one direction to represent a sell order and an arrow in another direction to represent a buy order.

28. The method for facilitating trading on a trading floor of claim 26 transforming the visual characteristics comprises a unique icon for a type of order.

29. The method for facilitating trading on a trading floor of claim 26 transforming the visual characteristics comprises a unique color for a type of order.

30. A computer implemented method for facilitating trading on a trading floor, the method comprising:
forming a ticker page on a wireless handheld computer, wherein the ticker page is associated with a unique negotiable item;
forming an object on the ticker page, wherein the object represents an order comprising a request to trade a quantity of the negotiable item; and
displaying a visual indication on the wireless handheld computer representing a capacity that a broker operating the wireless handheld computer will be acting in.

31. The method for facilitating trading on a trading floor of claim 30 wherein the visual indication comprises a capacity code.

32. The method for facilitating trading on a trading floor of claim 31 wherein the capacity code comprises a letter "A" to indicate an agent capacity; a letter "I" to indicate an individual Capacity; a letter "P" to indicate a principle capacity and a letter "O" to indicate an other capacity.

33. A computer implemented method for facilitating trading on a trading floor, the method comprising:
forming a ticker page on a wireless handheld computer, wherein the ticker page is associated with a unique negotiable item;
forming an object on the ticker page, wherein the object represents an order comprising a request to trade a quantity of the negotiable item;
recording a trade executed on a trading floor; and
storing a history of all recorded trades in the wireless handheld computer.

34. The method for facilitating trading on a trading floor of claim 33 wherein the history comprises data indicating an amount of the executed trade, a price for the executed trade and the counter trader for the executed trade.

* * * * *